United States Patent
Woltman et al.

(10) Patent No.: US 10,613,275 B2
(45) Date of Patent: Apr. 7, 2020

(54) CHANGING PULSE WIDTH TO REDUCE VISIBLE INTERFERENCE

(71) Applicant: Microsoft Technology Licensing, LLC, Redmond, WA (US)

(72) Inventors: Scott Woltman, Seattle, WA (US); Tuomas Vallius, Espoo (FI); Simo Tammela, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/941,281

(22) Filed: Mar. 30, 2018

(65) Prior Publication Data

US 2019/0302369 A1    Oct. 3, 2019

(51) Int. Cl.
| | |
|---|---|
| *G02B 6/293* | (2006.01) |
| *G02B 27/01* | (2006.01) |
| *G02B 6/122* | (2006.01) |
| *G02F 1/01* | (2006.01) |
| *G02F 1/225* | (2006.01) |

(Continued)

(52) U.S. Cl.
CPC ....... *G02B 6/29361* (2013.01); *G02B 6/1225* (2013.01); *G02B 27/0025* (2013.01); *G02B 27/0081* (2013.01); *G02B 27/0172* (2013.01); *G02F 1/0134* (2013.01); *G02F 1/225* (2013.01); *H01S 3/0057* (2013.01); *H01S 3/0602* (2013.01); *G02B 2027/0178* (2013.01); *G03B 21/2033* (2013.01)

(58) Field of Classification Search
CPC .. H04N 9/3111; H04N 9/3123; H04N 9/3138; H04N 9/3155; H04N 9/3158; H04N 9/3161; H04N 9/3164; H04N 9/3182; H04N 9/3185; H04N 9/31-3197; G03B 21/2006; G03B 21/2013; G03B 21/2033; G03B 21/2053; G03B 21/206; G03B 21/147; G03B 21/00-64; G02B 27/01-0189; G02B 2027/0105-0198
See application file for complete search history.

(56) References Cited

U.S. PATENT DOCUMENTS

| | | | |
|---|---|---|---|
| 9,927,611 B2 | 3/2018 | Rudy et al. | |
| 2006/0228073 A1* | 10/2006 | Mukawa | G02B 6/0026 385/31 |

(Continued)

OTHER PUBLICATIONS

"International Search Report and Written Opinion Issued in PCT Application No. PCT/US2019/023773", dated Jul. 1, 2019, 11 Pages.

*Primary Examiner* — Cara Rakowski
*Assistant Examiner* — Christopher A Lamb, II
(74) *Attorney, Agent, or Firm* — Holzer Patel Drennan (57) ABSTRACT

In an optical system that includes a coherent light source and an optical waveguide, a pulse width used by the optical waveguide to project image frames on a display is changed on a frame-by-frame basis. By changing the pulse width for each image frame, the locations and characteristics of visible interference patterns on the display are changed for each successive image frame. Changing the interference patterns for each image frame may result in the interference patterns being less detectable to a viewer. The change in pulse width for each image frame may be fixed or dynamic, and may be made in response to interference patterns being detected on the display.

20 Claims, 7 Drawing Sheets

(51) Int. Cl.
*H01S 3/00* (2006.01)
*H01S 3/06* (2006.01)
*G02B 27/00* (2006.01)
*G03B 21/20* (2006.01)

(56) References Cited

U.S. PATENT DOCUMENTS

| | | | | |
|---|---|---|---|---|
| 2009/0147154 A1* | 6/2009 | Arai | ............ | G02B 26/0841 348/750 |
| 2010/0231861 A1* | 9/2010 | Mizushima | ......... | G02B 3/0037 353/20 |
| 2010/0290009 A1* | 11/2010 | Chen | ............ | H01S 3/109 353/31 |
| 2012/0019167 A1* | 1/2012 | Chen | ............ | H05B 33/0842 315/307 |
| 2014/0232996 A1* | 8/2014 | Okamoto | ......... | G02B 27/48 353/85 |

* cited by examiner

CHANGING PULSE WIDTH TO REDUCE VISIBLE INTERFERENCE

BACKGROUND

Optical waveguides can be used to expand or replicate the exit pupil of an imaging system in one or two dimensions. Typically, light from the exit pupil of the imaging system is received in the waveguide through an entrance or in-coupling, and travels through the waveguide in a direction, while some of the light exits a grating structure of the waveguide to a display or the eye of a user. The remaining light that does not exit the grating structure may reflect off of the internal surfaces of the waveguide before finally exiting through the grating structure or some other part of the waveguide.

One issue with current waveguide-based exit pupil expanders is they may result in visible interference when used with coherent light sources. Coherent light sources are light sources containing a narrow range of frequencies. Coherent light sources when split into multiple paths by the waveguide will generally interfere with themselves when received by the display if the difference in optical path length traversed by each optical path of the light is less than a coherence length associated with the coherent light source. An example of a coherent light source is a laser.

Coherent light sources have several advantages over current LCoS (liquid crystal on silicon) based imaging systems, especially when used in head mounted display systems. For example, they have high sequential contrast ratios, lower weight and size, and can be adjusted to compensate for non-uniformities of the waveguide. Accordingly, there is a need to reduce the visible interference associated with coherent light sources and optical waveguides.

SUMMARY

In an optical system that includes a coherent light source and an optical waveguide, a pulse width used by the optical waveguide to project image frames on a display is changed on a frame-by-frame basis. By changing the pulse width for each image frame, the locations and characteristics of visible interference patterns on the display are changed for each successive image frame. Changing the interference patterns for each image frame may result in the interference patterns being less detectable to a viewer. The change in pulse width for each image frame may be fixed or dynamic, and may be made in response to interference patterns being detected on the display. Where the system includes multiple coherent light sources, the pulse widths used by each of the coherent light sources may be similarly changed. The optical system may be incorporated into a head mounted display device or other type of display device that uses coherent light sources.

In an implementation, a system for reducing visible interference associated with coherent light sources is provided. The system includes an optical waveguide, a coherent light source, and an interference engine. The interference engine is configured to receive a first image frame, cause the coherent light source to project the first image frame into the optical waveguide using a first pulse width, receive a second image frame, and cause the coherent light source to project the second image frame into the optical waveguide using a second pulse width, wherein the first pulse width is different than the second pulse width.

In an implementation, a method for reducing visible interference associated with coherent light sources is provided. The method may include receiving a first image frame at a computing device, selecting a first pulse width by the computing device, projecting the first image frame using the first pulse width by the computing device, receiving a second image frame at the computing device, selecting a second pulse width by the computing device, wherein the second pulse width is different than the first pulse width, and projecting the second image frame using the second pulse width by the computing device.

In an implementation, a system for reducing visible interference associated with coherent light sources is provided. The system may include an optical waveguide, a first coherent light source, a second coherent light source, and an interference engine. The interference engine may be configured to: select a first pulse width and a second pulse width, wherein the first pulse width is different than the second pulse width; receive a first image frame; cause the first coherent light source to project a first portion of the first image frame into the optical waveguide using the first pulse width; cause the second coherent light source to project a second portion of the first image frame into the optical waveguide using the second pulse width; receive a second image frame; cause the first coherent light source to project a first portion of the second image frame into the optical waveguide using the second pulse width; and cause the second coherent light source to project a second portion of the second image frame into the optical waveguide using the first pulse width.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
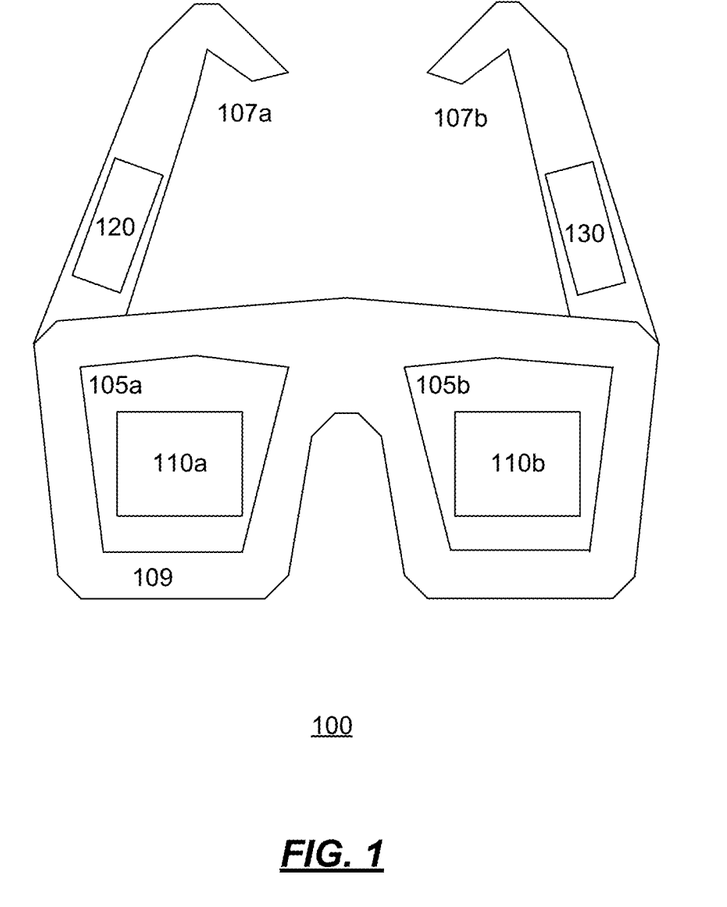
FIG. 1 is an illustration of an exemplary head mounted display device.

FIG. 1 is an illustration of an example head mounted display ("HMD") device 100. In an implementation, the HMD device 100 is a pair of glasses. The HMD device 100 includes lenses 105*a* and 105*b* arranged within a frame 109.

The frame 109 is connected to a pair of temples 107a and 107b. Arranged between each of the lenses 105 and a wearer's eyes is a near-eye display system 110. The system 110a is arranged in front of a right eye and behind the lens 105a. The system 110a is arranged in front of a left eye and behind the lens 105a. The HMD device 100 also includes a controller 120 and one or more sensors 130. The controller 120 may be a microcomputer operatively coupled to both near-eye display systems 110a and 110b and to the sensors 130. Other types of controllers 120 may be used.

The sensors 130 may be arranged in any suitable location on the HMD device 100. They may include a gyroscope or other inertial sensors, a global-positioning system (GPS) receiver, and/or a barometric pressure sensor configured for altimetry. The sensors 130 may provide data on the wearer's location or orientation. From the integrated responses of the sensors 130, the controller 120 may track the movement of the HMD device 100 within the wearer's environment.

In some implementations, the sensors 130 may include an eye tracker that is configured to detect an ocular state of the wearer of the HMD device 100. The eye tracker may locate a line of sight of the wearer, measure an extent of iris closure, etc. If two eye trackers are included, one for each eye, then the two may be used together to determine the wearer's focal plane based on the point of convergence of the lines of sight of the wearer's left and right eyes. This information may be used by the controller 120 for placement of a computer-generated image frame. The image frame may be a frame of a video, or the output of a computer application such as a video game, for example.

In some implementations, each of the near-eye display systems 110a and 110b may be at least partly transparent, to provide a substantially unobstructed field of view in which the wearer can directly observe their physical surroundings. Each of the near-eye display systems 110a and 110b may be configured to present, in the same field of view, a computer-generated image frame.

The controller 120 may control the internal componentry of the near-eye display systems 110a and 110b to form the desired image frame. In an implementation, the controller 120 may cause the near-eye display systems 110a and 110b to display approximately the same image frame concurrently, so that the wearer's right and left eyes receive the same image frame at approximately the same time. In other implementations, the near-eye display systems 110a and 110b may project somewhat different image frames concurrently, so that the wearer perceives a stereoscopic, i.e., three-dimensional, image frame.

In some implementations, the computer-generated image frames and various real images of objects sighted through the near-eye display systems 110a and 110b may occupy different focal planes. Accordingly, the wearer observing a real-world object may shift their corneal focus to resolve the image frame. In other implementations, the image frame and at least one real image may share a common focal plane.

In the HMD device 100, each of the near-eye display systems 110a and 110b may also be configured to acquire video of the surroundings sighted by the wearer. The video may include depth video and may be used to establish the wearer's location, what the wearer sees, etc. The video acquired by each near-eye display system 110a, 110b may be received by the controller 120, and the controller 120 may be configured to process the video received. To this end, the HMD device 100 may include a camera. The optical axis of the camera may be aligned parallel to a line of sight of the wearer of the HMD device 100, such that the camera acquires video of the external imagery sighted by the wearer.

As the HMD device 100 may include two near-eye display systems—one for each eye—it may also include two cameras. More generally, the nature and number of the cameras may differ in the various embodiments of this disclosure. One or more cameras may be configured to provide video from which a time-resolved sequence of three-dimensional depth maps is obtained via downstream processing.

No aspect of FIG. 1 is intended to be limiting in any sense, for numerous variants are contemplated as well. In some embodiments, for example, a vision system separate from the HMD device 100 may be used to acquire video of what the wearer sees. In some embodiments, a single near-eye display system extending over both eyes may be used instead of the dual monocular near-eye display systems 110a and 110b shown in FIG. 1.

The HMD device 100 may be used to support a virtual-reality ("VR") or augmented-reality ("AR") environment for one or more participants. A realistic AR experience may be achieved with each AR participant viewing their environment naturally, through passive optics of the HMD device 100. Computer-generated imagery may be projected into the same field of view in which the real-world imagery is received. Imagery from both sources may appear to share the same physical space.

The controller 120 in the HMD device 100 may be configured to run one or more computer programs that support the VR or AR environment. In some implementations, one or more computer programs may run on the controller 120 of the HMD device 100, and others may run on an external computer accessible to the HMD device 100 via one or more wired or wireless communication links. Accordingly, the HMD device 100 may include suitable wireless componentry, such as Wi-Fi.

Figure 2:
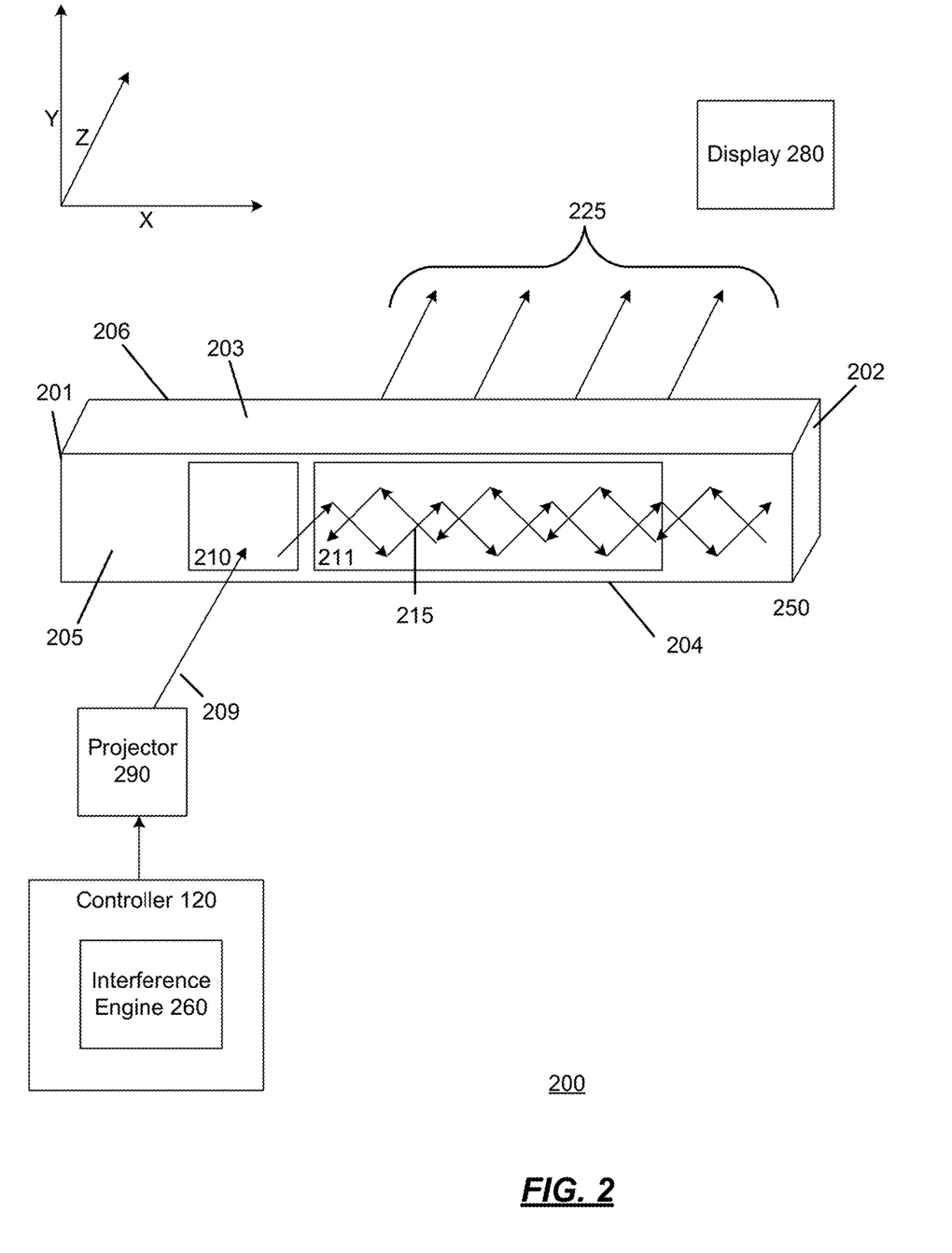
FIG. 2 is an illustration of an exemplary near-eye display system.

FIG. 2 is an illustration of an exemplary near-eye display system 200. The near-eye display system 200 may be an implementation of one or both of the near-eye display systems 110a and 110b shown in FIG. 1. In the example shown, the system 200 includes a projector 290, an optical waveguide 250, a controller 120, and a display 280.

The projector 290 may be adapted to form an image frame, and to project the image frame through an exit pupil of the projector 290. Light corresponding to the image frame is shown in the near-eye display system 200 as the light 209. The projector 290 may be operatively coupled to the controller 120. The controller 120 may provide suitable control signals that, when received by the projector 290, cause the desired image frame to be formed.

The optical waveguide 250 may include a plurality of surfaces including a front surface 205, a rear surface 206, a top surface 203, a bottom surface 204, a left-side surface 201, and a right-side surface 202. The optical waveguide 250 may be substantially transparent to light received normal to the front surface 205 in the Z direction. Light received normal to the front surface 205 may pass through the front surface 205 and the rear surface 206 to the display 280.

The optical waveguide 250 further includes an optical element 210. The optical element ("OE") 210 may receive the light 209 from an exit pupil of the projector 290, and may cause a portion of the light 209 to enter the optical waveguide 250 (i.e., in-couple). The portion of the light 209 that enters the optical waveguide 250 is illustrated in the optical waveguide 250 as the light 215. Depending on the implementation, the OE 210 may be a diffractive OE such as a diffractive grating. Examples of suitable diffractive gratings include surface-relief diffraction gratings ("SRGs") or volumetric gratings. However, other types of OEs may be used, such as mirrors and prisms, for example.

The OE 210 may cause the light 215 to propagate in the X direction towards the right-side surface 202. In particular, the OE 210 may cause the light 215 to propagate in the X direction by reflecting off of interior surfaces of the optical waveguide 250.

The optical waveguide 250 may further include an OE 211. As the light 215 propagates through the optical waveguide 250 and passes through the OE 211, the OE 211 may allow at least a portion of the light 215 to exit the optical waveguide 250 (i.e., out-couple) through the rear surface 206 as the light 225. Each ray of the light 225 may leave the rear surface through an exit pupil of the optical waveguide 250. The light 225 may be received by the display 280. Like the OE 210, the OE 211 may be a diffractive coating on the front surface 205 such as an SRG. Other types of diffractive gratings may be used. While shown on the front surface 205, the OE 211 may also be applied to the rear surface 206. The number and locations of the exit pupils of the optical waveguide 250 may depend on the properties of the OE 211.

The portion of the light 215 that does not exit the optical waveguide 250 through an exit pupil may continue in the X direction towards the right-side surface 202, The light 215 may exit the optical waveguide 250 through the right-side surface 202, or may be internally reflected back through the optical waveguide 250 towards the left-side surface 201. The internally reflected light may then be out-coupled by the OE 211, or may continue to be internally reflected.

As may be appreciated, the light 225 exiting the optical waveguide 250 through the exit pupils of the OE 211 is a pupil expansion of the exit pupil of the projector 290. Each arrow representing the light 225 may exit through an exit pupil of the optical waveguide 250.

Typically, the projectors 290 use incoherent light sources, rather than coherent light sources, to generate the light 209 that is used to project the image frame. A coherent light source may be a light source whose output light 209 includes photons that are oscillating in the same direction. This is in contrast with incoherent light sources where the photons may be oscillating in different directions. Examples of coherent light sources include lasers, and examples of incoherent light sources include LED light sources.

While coherent light sources have many advantages over incoherent light sources including higher power output and efficiency, they have one major drawback in that they are susceptible to interference when the total optical path is less than a coherence length of the coherent light source. The length of an optical path of a ray of light is the total distance that the ray of light travels from the projector 290 until it is received by the display 280, and includes the total distance that the ray travels within the optical waveguide 250 as the light 215, and the distance that the light travels from the rear surface 206 to the eye 280 as the light 225.

As described above, because the rays of the light 215 make different numbers of passes through the OE 211 before being out-coupled as the light 225, there may be many different path lengths for the rays of the light 225 received by the display 280. Depending on the differences between the lengths of the rays of light 225, there may either be constructive or destructive interference visible on the display 280.

Figure 3:
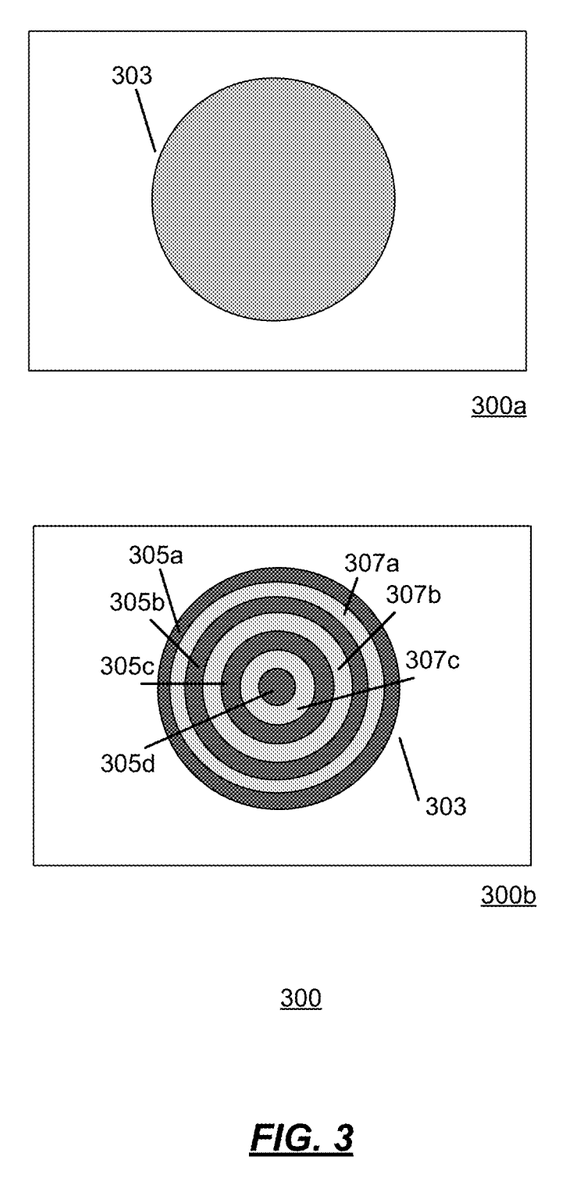
FIG. 3 is an illustration of an exemplary interference pattern.

For example, FIG. 3 shows an example interference pattern that may be associated with coherent light sources. The image frame 300a is an example of an image frame that is projected on the display 280 that includes a circle 303, The circle 303 is shown with a uniform medium grey color and has no visible interference patterns.

The image frame 300b is an example of an image frame of the same circle 303 but with visible interference patterns. In the example shown, the circle 303 includes several rings 305 (i.e., rings 305a-d) that are visibly darker than the color of the circle 303 shown in the image frame 300a. These rings 305 are areas of constructive interference due to the rays of light being in-phase with each other. The circle also includes several rings 307 (i.e., rings 307a-c) that are visibly lighter than the color of circle 303 shown in the image frame 300a. These rings 307 are areas of destructive interference due to the rays of light being out-of-phase with each other. The type of interference patterns shown in the image frame 300b are known as Newton's rings.

Returning to FIG. 2, in order to reduce the visible interference due to coherent light sources, the near-eye display system 200 includes an interference engine 260 that effectively changes the output spectra of the coherent light source on a-frame-by-frame basis. Changing the spectral characteristics for each image frame changes the location and/or appearance of the visible interference pattern for the image frames. Because of the high frame used by the near-eye display system 200 (e.g., 120 Hz), the resulting interference patterns become averaged out and less visible to the wearer of the near-eye display system 200.

As described further below, one way of changing the spectral characteristics of the coherent light source is through pulse width modulation. The interference engine 260 may periodically adjust or change a pulse width used by the coherent light source. In particular, the interference engine 260 may change the pulse width used by the coherent light source for each image frame in a sequence of image frames. Changing the pulse width changes the "effective temperature" of the coherent light source which may change the spectral characteristics of the coherent light source. By changing the pulse width for each image frame, the location and other characteristics of the resulting interference pattern that is visible to the wearer of the near-eye display system 200 is also changed for each image frame.

Because the visible coherence pattern is changed for each image frame, the overall amount of interference that is visible to the wearer of the HMD device 100 is reduced.

Other methods for changing the spectral characteristics of the coherent light source may be used. For example, the interference engine 260 may change the spectral characteristics by changing the pulse shape used by the coherent light source. In another example, the interference engine 260 may change the spectral characteristics by shifting the spectrum associated with the coherent light source. Other methods may be used such as a biasing scheme or by changing a laser cavity optical length, for example.

Figure 4:
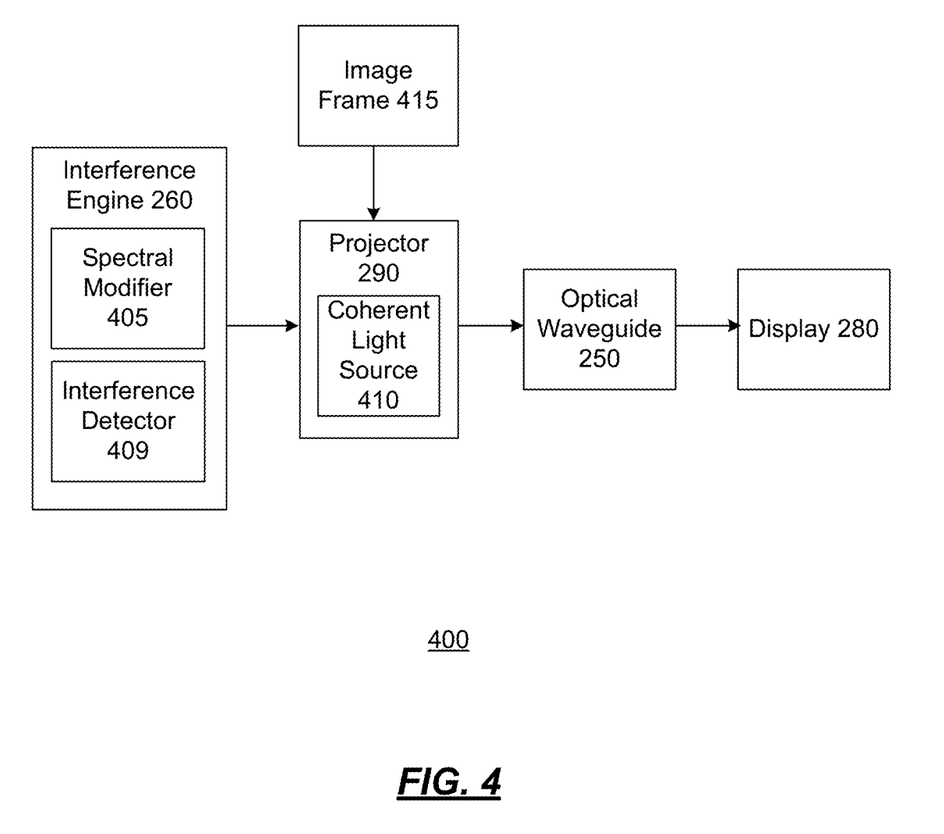
FIG. 4 is an illustration of an exemplary interference engine.

FIG. 4 is an illustration of an exemplary interference engine 260. The interference engine 260 includes components such as a spectral modifier 405 and an interference detector 409. More or fewer components may be supported. The interference engine 260 may be implemented by one or more computing devices such as the HMD device 100.

The spectral modifier 405 may effectively change the spectral characteristics of a coherent light source 410 to reduce visible inference with respect to an image frame 415 projected on a display 280. The coherent light source 410 may be a laser and may be part of a projector 290. In some implementations, the spectral modifier 405 may change the spectral characteristics of the coherent light source 410 for each image frame 415. For example, the spectral modifier 405 may use first spectral characteristics for a first image frame 415, and may use second spectral characteristics for a second image frame 415. The spectral modifier 405 may use the first spectral characteristics for a third image frame 415, or may use different spectral characteristics.

The spectral modifier 405 may change the spectral characteristics of the coherent light source 410 by changing a pulse width used by the coherent light source 410. Depending on the implementation, the spectral modifier 405 may increase or decrease the pulse width of the coherence light source 410 used for successive image frames 415 by approximately one to ten nanoseconds. The amount that the pulse width is changed may be fixed or randomly selected. The amount that the pulse width is changed may set by a user, or may be automatically selected during a calibration phase. Any method or technique for changing a pulse width of a coherent light source 410 may be used.

The spectral modifier 405 may further change the spectral characteristics by shifting a spectrum used by the coherent light source 410. For example, the spectral modifier 405 may shift the spectrum of the coherent light source 410 by applying a bias current to the coherent light source 410. The spectrum used by the coherent light source 410 may be shifted by changing the amount of bias current that is applied. Other methods for shifting a spectrum of a coherent light source 410 may be used.

The spectral modifier 405 may further change the spectral characteristics by changing a pulse shape used by the coherent light source 410. Any method for changing a pulse shape of a coherent light source 410 may be used.

In systems with more than one coherence light source 410, the spectral modifier 405 may change the spectral characteristics of each of the coherent light sources 410. For example, the projector 290 may include a first coherent light source 410 that projects blue light, a second coherent light source 410 that projects red light, and third coherent light source 410 that projects green light. For a first image frame 415, the spectral modifier 405 may cause the first coherent light source 410 to project a portion of the first image frame 415 that corresponds to the blue light using a first pulse width, may cause the second coherent light source 410 to project a portion of the first image frame 415 that corresponds to the red light using the first pulse width, and may cause the third coherent light source 410 to project a portion of the first image frame 415 that corresponds to the green light using the first pulse width.

For a subsequent second image frame 415, the spectral modifier 405 may change the pulse widths used for each of the first, second, and third coherent light sources 410. The spectral modifier 405 may use the same pulse widths for each coherent light source 410, may change the each pulse width by a same amount, or may use a different pulse width for each coherent light source 410. For example, the spectral modifier 405 may cause the first coherent light source 410 to project a portion of the second image frame 415 that corresponds to the blue light using a second pulse width, may cause the second coherent light source 410 to project a portion of the second image frame 415 that corresponds to the red light using the second pulse width, and may cause the third coherent light source 410 to project a portion of the second image frame 415 that corresponds to the green light using the second pulse width.

In some implementations, the projector 290 may include multiple coherent light sources 410 per light color. For example, the projector 290 may include two coherent light sources 410 for the color red, two coherent light sources 410 for the color blue, and two coherent light sources 410 for the color green. In these implementations, for each light color, the spectral modifier 405 may cause the first coherent light source 410 to use a first pulse width and the second coherent light source 410 to use a second pulse width for a first image frame 415, and may cause the first coherent light source 410 to use the second pulse width and the second coherent light source 410 to use the first pulse width for a subsequent second image frame 415. Other combinations of pulse widths may be used.

The interference detector 409 may detect or measure interference in a projected image frame 415, and may instruct the spectral modifier 405 to change the spectral characteristics of one or more coherent light sources 410 in response to the determination. In some implementations, the interference detector 409 may operate as part of a calibration phase where various image frames 415 are projected onto the display 280 by the coherent light sources 410. The performance of the coherent light sources 410 may be measured for various metrics such as brightness, contrast level, sharpness, and any interference patterns may be detected. Any method or technique for detecting interference patterns may be used.

The interference detector 409 may instruct the spectral modifier 405 to adjust the spectral characteristics in response to any detected interference patterns. For example, the interference detector 409 may instruct the spectral modifier 405 to change the pulse width used by the coherent light source 410 by some amount for each successive image frame 415. After making the change, the interference detector 409 may continue to measure the metrics associated with the display 280 to ensure that the change in the spectral characteristics has not resulted in any adverse effects such as a reduction in brightness. If the change in the pulse width results in adverse effects, the interference detector 409 may recommend a smaller change in the pulse width be used for each image frame 415, for example.

In some implementations, the interference detector 409 may continuously monitor the image frames 415 projected on the display 280 for interference. In response to the detected interference, the interference detector 409 may instruct the spectral modifier 405 to change the pulse width used by the coherent light source 410. Alternatively or additionally, the interference detector 409 may instruct the spectral modifier 405 to change the pulse shape or shift the spectrum used by the coherent light source 410.

Figure 5:
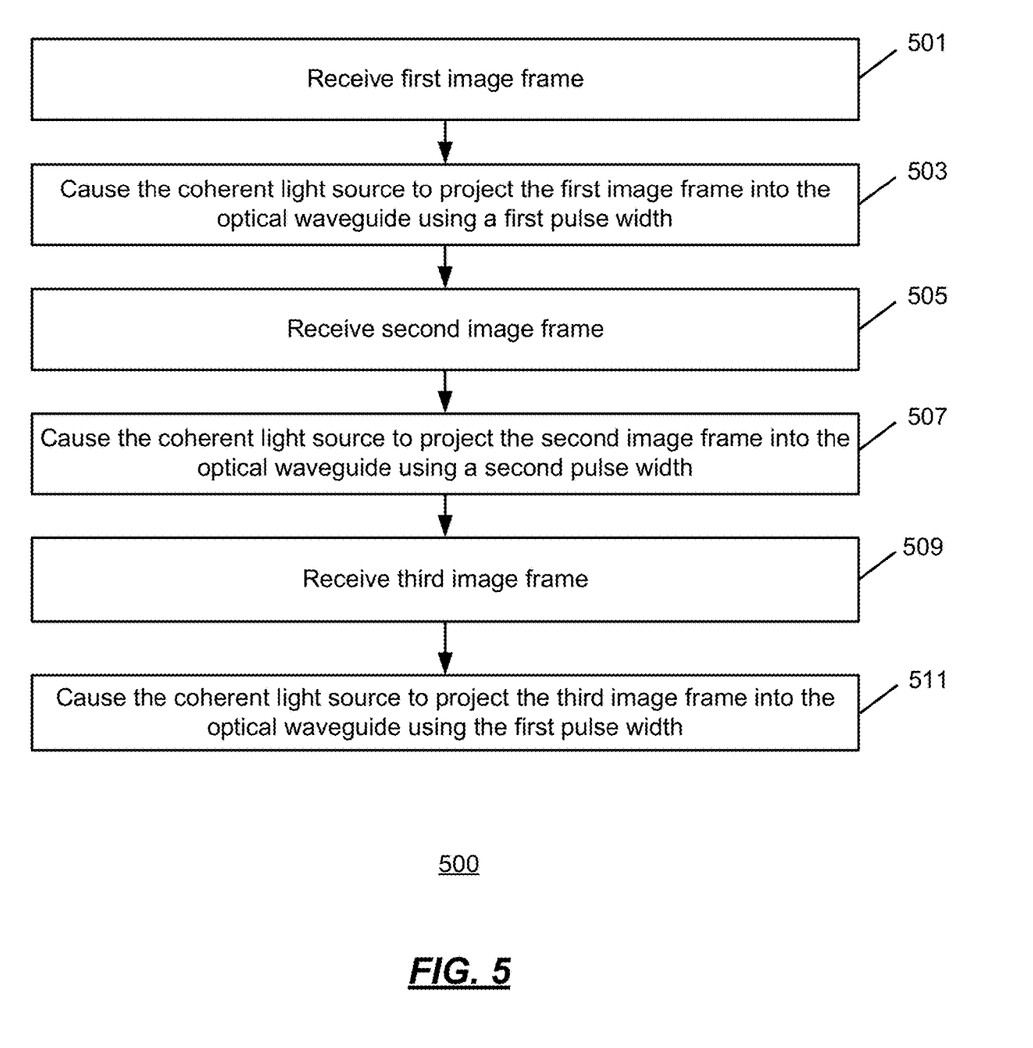
FIG. 5 is an operational flow of an implementation of a method for reducing visible interference in an HMD device using one or more coherent light sources.

FIG. 5 is an operational flow of an implementation of a method 500 for reducing visible interference in an HMD device 100 using one or more coherent light sources 410. The method 500 may be implemented by the interference engine 260, for example.

At 501, a first image frame is received. The first image frame 415 may be received by the coherent light source 410. The coherent light source 410 may be a laser. The first image frame 415 may be an image frame 415 of a video or output of an application currently being viewed and/or used by a wearer of an HMD device 100. The HMD device 100 may include an optical waveguide 250 and a display 280.

At 503, the coherent light source is caused to project the first image frame into the optical waveguide using a first pulse width. The coherent light source 410 may be caused to project the first image frame 415 using the first pulse width by the interference engine 260.

At 505, a second image frame is received. The second image frame 415 may be received by the coherent light source 410. The second image frame 415 may be a next image frame 415 of the video or the output of the application currently being viewed and/or used by the wearer of the HMD device 100.

At 507, the coherent light source is caused to project the second image frame into the optical waveguide using a second pulse width. The coherent light source 410 may be caused to project the second image frame 415 using the second pulse width by the interference engine 260. The second pulse width may be selected by the interference engine 260 to reduce visible interference on the display 280. A difference between the first pulse width and the second pulse width may be between one and ten nanoseconds. Depending on the implementation, additional steps may be taken to reduce visible interference such as shifting a spectrum associated with the coherent light source 410 or changing a pulse width shape.

At 509, a third image frame is received. The third image frame 415 may be received by the coherent light source 410. The third image frame 415 may be a next image frame 415 of the video or the output of the application currently being viewed and/or used by the wearer of the HMD device 100.

At 511, the coherent light source is caused to project the third image frame into the optical waveguide using the first pulse width. The coherent light source 410 may be caused to project the third image frame 415 using the first pulse width by the interference engine 260. Alternatively, the coherent light source 410 may be caused to project the third image frame 415 using a third pulse width.

Figure 6:
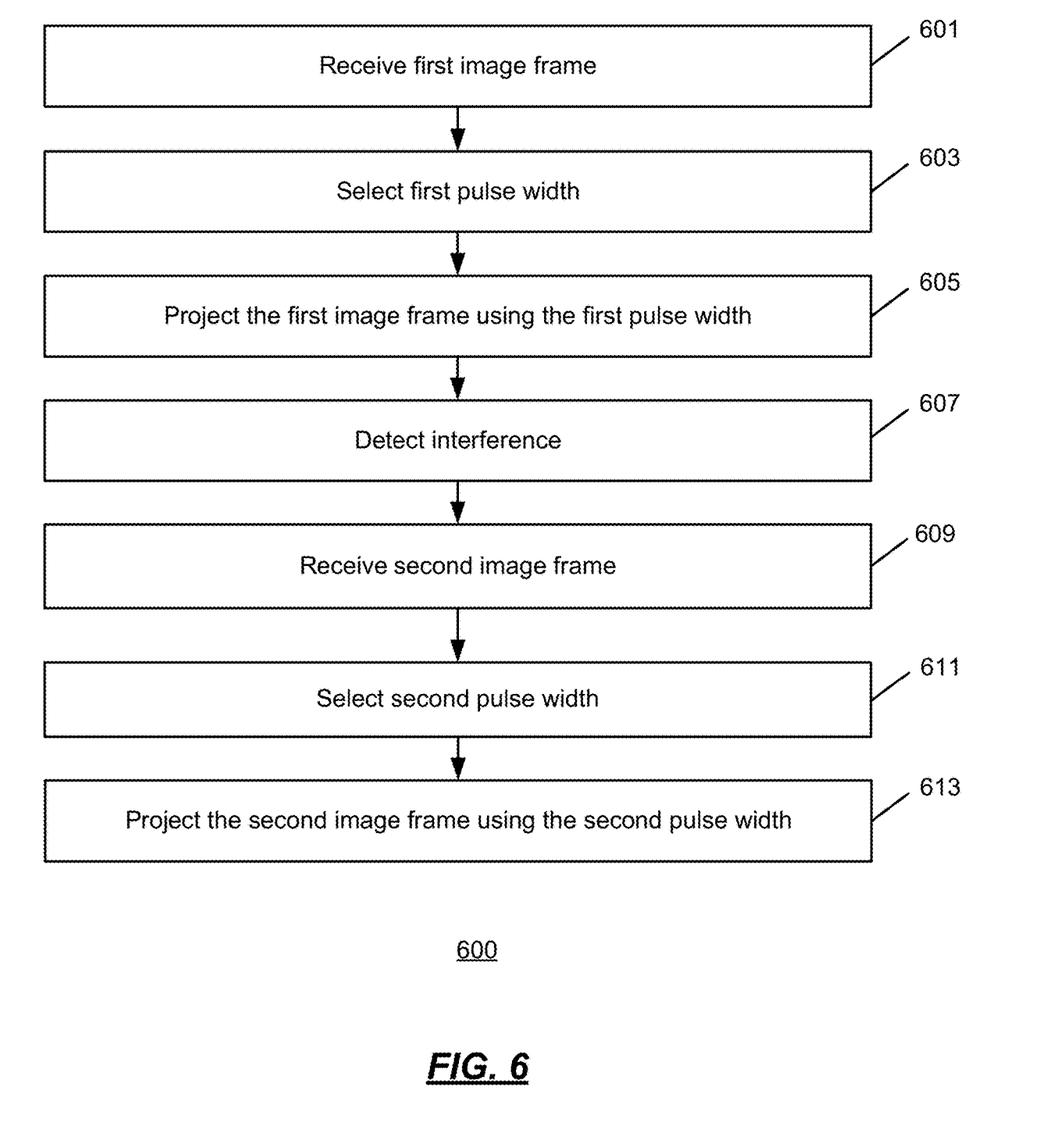
FIG. 6 is an operational flow of an implementation of a method for reducing visible interference in an HMD device using one or more coherent light sources.

FIG. 6 is an operational flow of an implementation of a method 600 for reducing visible interference in an HMD device 100 using one or more coherent light sources 410. The method 600 may be implemented by the interference engine 260, for example.

At 601, a first image frame is received. The first image frame 415 may be received by the coherent light source 410. The coherent light source 410 may be a laser. The first image frame 415 may be an image frame 415 of a video or output of an application currently being viewed and/or used by a wearer of an HMD device 100. The HMD device 100 may include an optical waveguide 250 and a display 280.

At 603, a first pulse width is selected. The first pulse width may be selected by the spectral modifier 405.

At 605, the first image frame is projected using the first pulse width. The first image frame 415 may be projected by the coherent light source 410 into the optical waveguide 250.

At 607, interference is detected. The interference may be visible interference that is detected by the interference detector 409 in the projected first image frame 415. The visible interference may be associated with the use of the coherent light source 410. Any method for detecting visible interference may be used. Depending on the implementation, the interference may be detected as part of a calibration phase associated with the HMD device 100.

At 609, a second image frame is received. The second image frame 415 may be received by the coherent light source 410. The second image frame 415 may be a next image frame of the video or the output of the application currently being viewed and/or used by the wearer of the HMD device 100.

At 611, a second pulse width is selected. The second pulse width may be selected by the spectral modifier 405. The second pulse width may be selected based on the detected interference to effectively change the spectral characteristics of the coherent light source 410. By changing the spectral characteristics the location and characteristics of the detected interference may be changed resulting in the interference being overall less visible to the user. Other methods for changing the spectral characteristics of the coherent light source 410 may be used, including shifting a spectrum of the coherent light source 410 and changing a pulse shape of the coherent light source 410.

At 613, the second image from is projected using the second pulse width. The second image frame 415 may be projected by the coherent light source 410 into the optical waveguide 250.

Figure 7:
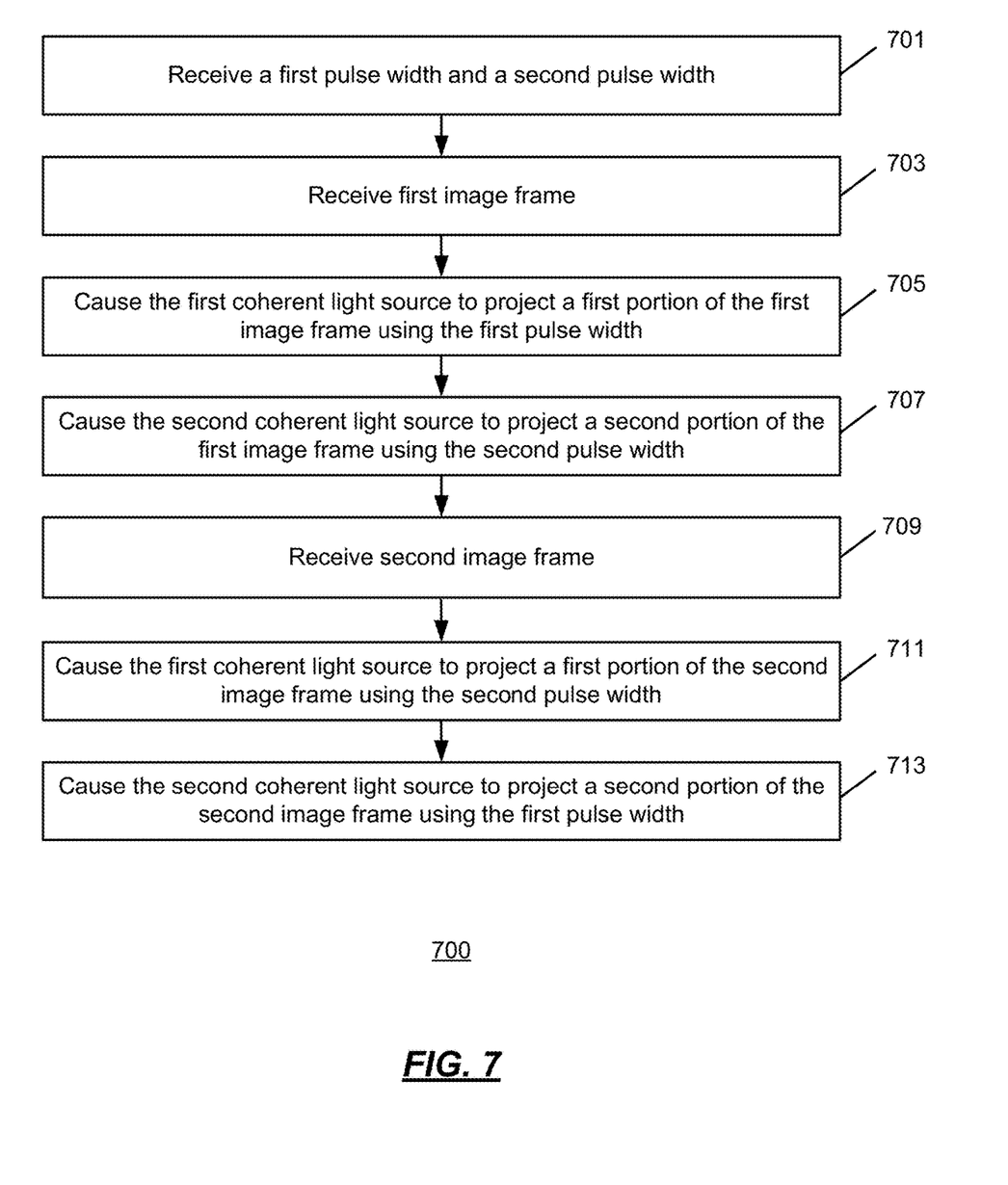
FIG. 7 is an operational flow of an implementation of a method for reducing visible interference in an HMD device using two or more coherent light sources.

FIG. 7 is an operational flow of an implementation of a method 700 for reducing visible interference in an HMD device 100 using two or more coherent light sources 410. The method 700 may be implemented by the interference engine 260, for example.

At 701, a first pulse width and a second pulse width are received. The first pulse width and the second pulse width may be received by the projector 290 from the spectral modifier 405. The first and second pulse widths may have been selected to reduce visible interference in the HMD device 100 without unduly harming characteristics of the HMD device 100 such as brightness and contrast. Depending on the implementation, a difference between the first pulse width and the second pulse width may be between one and ten nanoseconds.

The first and second pulse widths may be received for a first coherent light source 410 and a second coherent light source 410. The first coherent light source 410 and the second coherent light source 410 may be associated with the same or different color of light. The first coherent light source 410 and the second coherent light source 410 may be lasers.

At 703, a first image frame is received. The first image frame 415 may be received by the first coherent light source 410 and the second coherent light source 410. The first image frame 415 may have a first portion and a second portion. In implementations where the first coherent light source 410 and the second coherent light source 410 are the same color of light, the first portion of the first image frame 415 may correspond to even lines of the first image frame 415 and the second portion of the first image frame 415 may correspond to odd lines of the first image frame 415. In implementations where the first coherent light source 410 and the second coherent light source 410 correspond to different colors, the first portion of the first image frame 415 may correspond to blue colors of the first image frame 415 and the second portion of the first image frame 415 may correspond to red colors of the first image frame 415. Other configurations and colors may be supported.

At 705, the first coherent light source is caused to project the first portion of the first image frame using the first pulse width. The first coherent light source 410 may be caused to project the first portion of the first image frame 415 using the first pulse width by the interference engine 260. The first portion of the first image frame 415 may be projected into an optical waveguide 250 of the HMD device 100.

At 707, the second coherent light source is caused to project the second portion of the first image frame using the second pulse width. The second coherent light source 410 may be caused to project the second portion of the first image frame 415 using the second pulse width by the interference engine 260. The second portion of the first image frame 415 may be projected into the optical waveguide 250 of the HMD device 100.

At 709, a second image frame is received. The second image frame 415 may be received by the first coherent light source 410 and the second coherent light source 410. The second image frame 415 may have a first portion and a second portion.

At 711, the first coherent light source is caused to project the first portion of the second image frame using the second pulse width. The first coherent light source 410 may be caused to project the first portion of the second image frame 415 using the second pulse width by the interference engine 260.

At 713, the second coherent light source is caused to project the second portion of the second image frame using the first pulse width. The second coherent light source 410 may be caused to project the second portion of the second image frame 415 using the first pulse width by the interference engine 260.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for reducing visible interference associated with coherent light sources is provided. The system includes: an optical waveguide; a coherent light source; and an interference engine. The interference engine is configured to: receive a first image frame; cause the coherent light source to project the first image frame into the optical waveguide using a first pulse width; receive a second image frame; and cause the coherent light source to project the second image frame into the optical waveguide using a second pulse width, wherein the first pulse width is different than the second pulse width.

Implementations may include some or all of the following features. The interference engine may be further configured to select a difference between the first pulse width and the second pulse width. The coherent light source may be a laser. The system may be part of a head mounted display device. The interference engine may be further configured to detect interference in the projected first image frame, and in response to the detection, cause the coherent light source to project the second image frame into the optical waveguide using the second pulse width. The interference engine may be further configured to: receive a third image frame; and cause the coherent light source to project the third image frame into the optical waveguide using the first pulse width.

In an implementation, a method for reducing visible interference associated with coherent light sources is provided. The method may include: receiving a first image frame at a computing device; selecting a first pulse width by the computing device; projecting the first image frame using the first pulse width by the computing device; receiving a second image frame at the computing device; selecting a second pulse width by the computing device, wherein the second pulse width is different than the first pulse width; and projecting the second image frame using the second pulse width by the computing device.

Implementations may include some or all of the following features. The method may include detecting interference in the first image frame, and selecting the second pulse width based on the detected interference. The computing device may include a coherent light source, and projecting the first image frame using the first pulse width by the computing device may include projecting the first image frame using the first pulse width by the coherent light source. The method may further include shifting a spectrum associated with the coherent light source. The coherent light source may be a laser. The computing device may include a first coherent light source and a second coherent light source, and projecting the first image frame using the first pulse width may include: projecting a first portion of the first image frame by the first coherent light source using the first pulse width; and projecting a second portion of the first image frame by the second coherent light source using the first pulse width. Projecting the second image frame using the second pulse width may include: projecting a first portion of the second image frame by the first coherent light source using the second pulse width; and projecting a second portion of the second image frame by the second coherent light source using the second pulse width. The computing device may be part of a head mounted display device. The method may include: receiving a third image frame at the computing device; selecting the first pulse width by the computing device; and projecting the third image frame using the first pulse width by the computing device.

In an implementation, a system for reducing visible interference associated with coherent light sources is provided. The system may include: an optical waveguide; a first coherent light source; a second coherent light source; and an interference engine. The interference engine may be configured to: select a first pulse width and a second pulse width, wherein the first pulse width is different than the second pulse width; receive a first image frame; cause the first coherent light source to project a first portion of the first image frame into the optical waveguide using the first pulse width; cause the second coherent light source to project a second portion of the first image frame into the optical waveguide using the second pulse width; receive a second image frame; cause the first coherent light source to project a first portion of the second image frame into the optical waveguide using the second pulse width; and cause the second coherent light source to project a second portion of the second image frame into the optical waveguide using the first pulse width.

Implementations may include some or all of the following features. The interference engine may be further configured to: receive a third image frame; cause the first coherent light source to project a first portion of the third image frame into the optical waveguide using the first pulse width; and cause the second coherent light source to project a second portion of the third image frame into the optical waveguide using the second pulse width. The system may be part of a head mounted display device. The first coherent light source may be a laser. The first coherent light source may be associated with a first color of light, and the second coherent light source may be associated with a second color of light.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for reducing visible interference associated with coherent light sources, the system comprising:
   an optical waveguide;
   a coherent light source; and
   an interference engine configured to:
   receive a first image frame;

cause the coherent light source to project the first image frame into the optical waveguide using a first pulse width;
detecting an interference pattern in the first image frame;
receive a second image frame; and
cause the coherent light source to project the second image frame into the optical waveguide using a second pulse width, wherein the first pulse width is different than the second pulse width and the difference between the first pulse width and the second pulse width is selected based on the interference pattern detected in the first image.

2. The system of claim 1, wherein the interference engine is further configured to select the difference between the first pulse width and the second pulse width based on a measured contrast level of the interference pattern.

3. The system of claim 1, wherein the coherent light source comprises a laser.

4. The system of claim 1, wherein the system is part of a head mounted display device.

5. The system of claim 1, wherein the interference engine is further configured to detect interference in the projected first image frame, and in response to the detection, cause the coherent light source to change pulse width used by the coherent light source by a predetermined amount for each successive image frame.

6. The system of claim 1, wherein the interference engine is further configured to:
receive a third image frame; and
cause the coherent light source to project the third image frame into the optical waveguide using the first pulse width.

7. A method for reducing visible interference associated with coherent light sources, the method comprising:
receiving a first image frame at a computing device;
selecting a first pulse width by the computing device;
projecting the first image frame using the first pulse width by the computing device;
receiving a second image frame at the computing device;
selecting a second pulse width by the computing device, wherein the second pulse width is different than the first pulse width and the difference between the first pulse width and the second pulse width is selected based on an interference pattern in the first image; and
projecting the second image frame using the second pulse width by the computing device.

8. The method of claim 7, further comprising detecting interference in the first image frame, and in response to the detection, causing the coherent light source to change pulse width used by the coherent light source by a predetermined amount for each successive image frame.

9. The method of claim 7, wherein the computing device comprises a coherent light source, and projecting the first image frame using the first pulse width by the computing device comprises projecting the first image frame using the first pulse width by the coherent light source.

10. The method of claim 9, further comprising shifting a spectrum associated with the coherent light source.

11. The method of claim 9, further comprising changing a pulse shape associated with the coherent light source.

12. The method of claim 7, wherein the computing device comprises a first coherent light source and a second coherent light source, and projecting the first image frame using the first pulse width comprises:
projecting a first portion of the first image frame by the first coherent light source using the first pulse width; and
projecting a second portion of the first image frame by the second coherent light source using the first pulse width.

13. The method of claim 12, wherein projecting the second image frame using the second pulse width comprises:
projecting a first portion of the second image frame by the first coherent light source using the second pulse width; and
projecting a second portion of the second image frame by the second coherent light source using the second pulse width.

14. The method of claim 12, wherein the computing device is part of a head mounted display device.

15. The method of claim 7, further comprising:
receiving a third image frame at the computing device;
selecting the first pulse width by the computing device; and
projecting the third image frame using the first pulse width by the computing device.

16. A system for reducing visible interference associated with coherent light sources, the system comprising:
an optical waveguide;
a first coherent light source;
a second coherent light source; and
an interference engine configured to:
select a first pulse width;
receive a first image frame;
cause the first coherent light source to project a first portion of the first image frame into the optical waveguide using the first pulse width;
detect an interference pattern in the first image frame
select a second pulse width based on an interference pattern, the second pulse width being different than the first pulse width and the difference between the first pulse width and the second pulse width based on a measured contrast level of the interference pattern;
cause the second coherent light source to project a second portion of the first image frame into the optical waveguide using the second pulse width;
receive a second image frame;
cause the first coherent light source to project a first portion of the second image frame into the optical waveguide using the second pulse width; and
cause the second coherent light source to project a second portion of the second image frame into the optical waveguide using the first pulse width.

17. The system of claim 16, wherein the interference engine is further configured to:
receive a third image frame;
cause the first coherent light source to project a first portion of the third image frame into the optical waveguide using the first pulse width; and
cause the second coherent light source to project a second portion of the third image frame into the optical waveguide using the second pulse width.

18. The system of claim 16, wherein the system is part of a head mounted display device.

19. The system of claim 16, wherein the first coherent light source comprises a laser.

20. The system of claim 16, wherein the first coherent light source is associated with a first color of light, and the second coherent light source is associated with a second color of light.

* * * * *